(12) United States Patent
Chang et al.

(10) Patent No.: US 6,905,534 B2
(45) Date of Patent: Jun. 14, 2005

(54) METHOD AND APPARATUS FOR REMOVING VAPOR PHASE CONTAMINANTS FROM A FLUE GAS STREAM

(75) Inventors: Ramsay Chang, Los Altos, CA (US); Sharon Sjostrom, Denver, CO (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 10/431,553

(22) Filed: May 6, 2003

(65) Prior Publication Data

US 2004/0045437 A1 Mar. 11, 2004

Related U.S. Application Data

(63) Continuation-in-part of application No. 10/124,000, filed on Apr. 16, 2002, now Pat. No. 6,695,894.
(60) Provisional application No. 60/284,588, filed on Apr. 16, 2001.

(51) Int. Cl.$^7$ .......................... B01D 53/04; B01D 46/04
(52) U.S. Cl. ................... 96/55; 96/74; 96/134; 96/146; 96/154; 96/355; 55/341.1; 110/345
(58) Field of Search .................... 95/134, 148, 57, 95/63, 69, 70, 278, 279, 280, 282; 55/341.1; 110/345; 96/108, 134, 15, 55, 57, 74, 143, 144, 146, 154, 355

(56) References Cited

U.S. PATENT DOCUMENTS

| | | | |
|---|---|---|---|
| 2,215,323 A | | 9/1940 | Guthrie |
| 2,819,800 A | * | 1/1958 | Goodloe .................. 210/497.1 |
| 3,541,025 A | | 11/1970 | Oda et al. |
| 3,608,273 A | | 9/1971 | Fabuss et al. |
| 3,693,323 A | | 9/1972 | Gant |
| 3,793,806 A | | 2/1974 | Fornoff |
| 3,951,856 A | | 4/1976 | Repik et al. |
| 4,045,368 A | | 8/1977 | Katori et al. |
| 4,134,743 A | | 1/1979 | Macriss |

(Continued)

FOREIGN PATENT DOCUMENTS

| | | |
|---|---|---|
| DE | 29 32 274 A1 | 8/1979 |
| JP | 09-271638 A | * 10/1997 |

OTHER PUBLICATIONS

Chang et al., Pilot Scale Evaluation of Carbon Compound Additives for the Removal of Trace Metals at Coal–Fired Utility Power Plantsl,: *Second International Conference on Managing Hazardous Air Pollutants*, Jul. 1993, pp. VI–41to VI–57.

"Activated Carbon," *Kirk–Othmer Encyclopedia of Chemical Technology 4$^{th}$. Ed.*, vol. 4, 1992, pp. 1015–1037.

U.S. Appl. No. 10/052,421, filed Jan. 17, 2002, Chang et al., entitled "Method and Apparatus for Renewable Mercury Sorption".

*Primary Examiner*—Frank M. Lawrence
(74) *Attorney, Agent, or Firm*—Morgan Lewis & Bockius LLP

(57) ABSTRACT

The present invention provides a method and apparatus for removing trace contaminants from a gas stream or flue gas. In one embodiment, the present invention an apparatus for removing a trace contaminant from a gas stream, comprising a gas duct configured to receive a gas stream comprising a trace contaminant; a plurality of substrates disposed within the gas duct; a trace contaminant sorbent disposed on at least a portion of each of the substrates; an isolation device for separating the portion of each of the substrates from the gas stream; and a regenerator for regenerating the trace contaminant sorbent. In another embodiment, the present invention provides a method for removing a trace contaminant from a gas stream.

22 Claims, 13 Drawing Sheets

U.S. PATENT DOCUMENTS

| | | | |
|---|---|---|---|
| 4,415,342 A | | 11/1983 | Foss |
| 4,419,107 A | | 12/1983 | Roydhouse |
| 4,445,912 A | * | 5/1984 | Volk et al. .................... 55/283 |
| 4,491,609 A | | 1/1985 | Degel et al. |
| 4,500,327 A | | 2/1985 | Nishino et al. |
| 4,617,035 A | | 10/1986 | Wakaizumi et al. |
| 4,690,914 A | | 9/1987 | Callut et al. |
| 4,764,355 A | * | 8/1988 | Romey et al. ......... 423/244.03 |
| 4,883,499 A | | 11/1989 | Beierle et al. |
| 4,889,698 A | | 12/1989 | Moller et al. |
| 4,921,826 A | | 5/1990 | Juntgen et al. |
| 4,921,831 A | | 5/1990 | Nakai et al. |
| 4,987,115 A | | 1/1991 | Michel-Kim |
| 5,000,007 A | | 3/1991 | Haefner |
| 5,064,805 A | | 11/1991 | Otowa |
| 5,089,030 A | | 2/1992 | Michel-Kim |
| 5,110,480 A | | 5/1992 | Yan |
| 5,124,292 A | | 6/1992 | Larsen et al. |
| 5,141,724 A | | 8/1992 | Audeh |
| 5,164,355 A | | 11/1992 | Farris et al. |
| 5,187,141 A | | 2/1993 | Jha et al. |
| 5,287,383 A | | 2/1994 | Hirai |
| 5,304,527 A | | 4/1994 | Dimitri |
| 5,306,675 A | | 4/1994 | Wu et al. |
| 5,312,599 A | | 5/1994 | Schwartz, Jr. |
| 5,352,370 A | | 10/1994 | Hayden |
| 5,352,647 A | | 10/1994 | Suchenwirth |
| 5,354,363 A | | 10/1994 | Brown, Jr. et al. |
| 5,364,821 A | | 11/1994 | Holland |
| 5,370,720 A | | 12/1994 | Duncan |
| 5,387,406 A | * | 2/1995 | Ruoff ......................... 423/210 |
| 5,406,006 A | | 4/1995 | Hill et al. |
| 5,409,522 A | | 4/1995 | Durham et al. |
| 5,419,884 A | | 5/1995 | Weekman et al. |
| 5,438,029 A | | 8/1995 | Kobata et al. |
| 5,444,031 A | | 8/1995 | Hayden |
| 5,505,766 A | | 4/1996 | Chang |
| 5,538,932 A | | 7/1996 | Yan et al. |
| 5,569,436 A | | 10/1996 | Lerner |
| 5,575,982 A | | 11/1996 | Reiss et al. |
| 5,628,819 A | | 5/1997 | Mestemaker et al. |
| 5,672,323 A | | 9/1997 | Bhat et al. |
| 5,733,515 A | | 3/1998 | Doughty et al. |
| 5,795,548 A | * | 8/1998 | Madden et al. ............. 422/171 |
| 5,827,352 A | | 10/1998 | Altman et al. |
| 5,854,173 A | | 12/1998 | Chang et al. |
| 5,948,143 A | | 9/1999 | Sjostrom et al. |
| 6,103,205 A | | 8/2000 | Wojtowicz et al. |
| 6,136,072 A | | 10/2000 | Sjostrom et al. |
| 6,197,097 B1 | | 3/2001 | Ertl et al. |
| 6,264,905 B1 | | 7/2001 | Spokoyny |
| 6,451,091 B1 | * | 9/2002 | Avina ......................... 95/107 |
| 6,451,094 B1 | | 9/2002 | Chang et al. |
| 6,517,610 B1 | | 2/2003 | de la Houssaye |
| 6,558,454 B1 | | 5/2003 | Chang et al. |
| 6,695,894 B2 | * | 2/2004 | Chang et al. .................. 95/134 |
| 6,712,878 B2 | * | 3/2004 | Chang et al. .................. 95/90 |

* cited by examiner

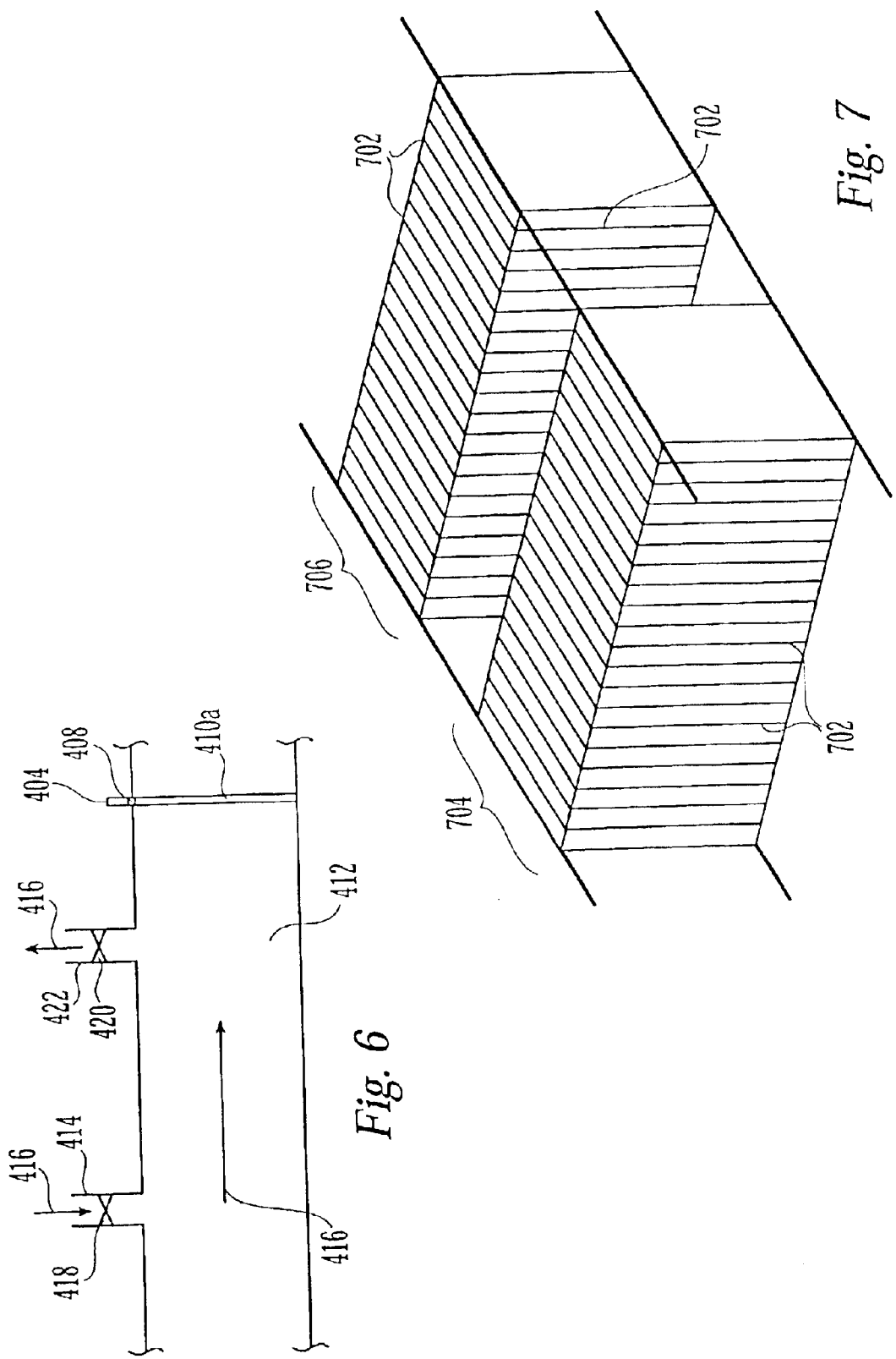

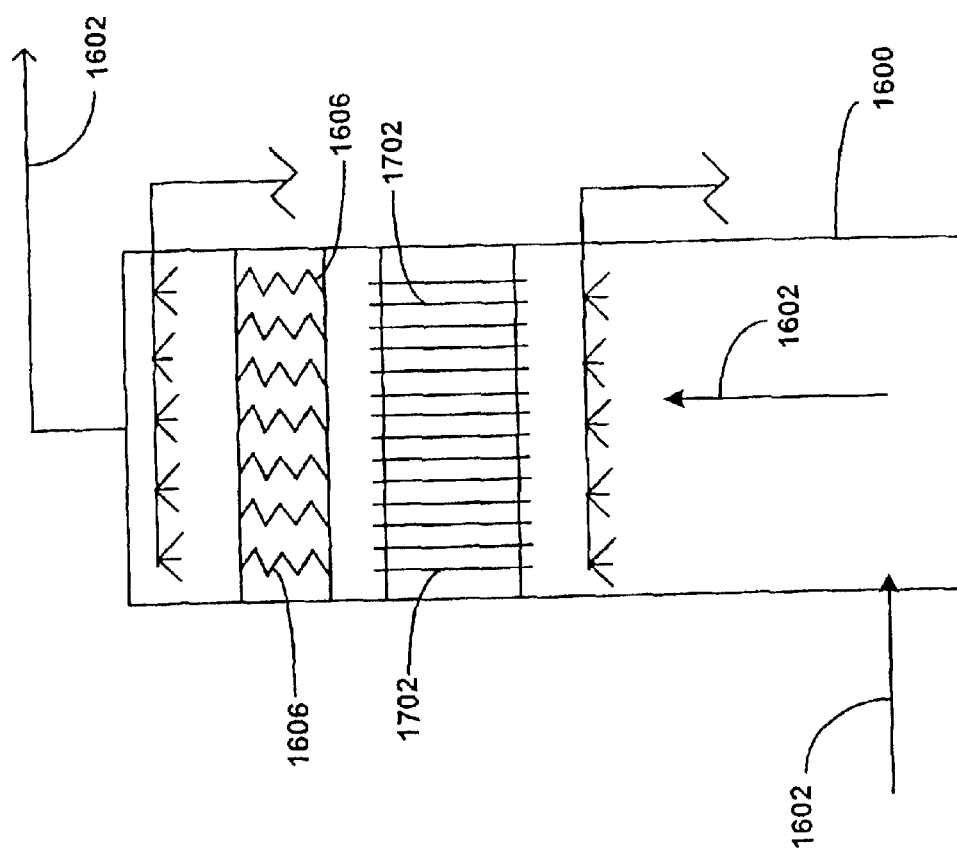

METHOD AND APPARATUS FOR REMOVING VAPOR PHASE CONTAMINANTS FROM A FLUE GAS STREAM

This application is a continuation-in-part of U.S. patent application Ser. No. 10/124,000 filed Apr. 16, 2002, now U.S. Pat. No. 6,695,894, which claims the benefit of U.S. Provisional Application No. 60/284,588 filed Apr. 16, 2001. Both of these applications are incorporated herein by reference in their entirety.

BACKGROUND OF THE INVENTION

1. Field of the Invention

The invention relates generally to the removal of vapor phase contaminants from a gas stream. More specifically, the invention is directed to the removal of vapor phase mercury from the flue gas of a combustion system.

2. Description of Related Art

The emission of trace metals from utility power plants is an important issue in light of the 1990 Clean Air Act Amendment (CAAA), Title III. In particular, special attention has been given to mercury (Hg) in terms of its environmental release and impacts, and the Environmental Protection Agency (EPA) is closely scrutinizing sources that emit mercury. Mercury is present in flue gas from a fossil-fuel-fired combustion system in very low concentrations (<1 ppm) and forms a number of volatile compounds that are difficult to remove. Specially designed and costly emissions-control systems are required to effectively capture these trace amounts of mercury.

Several approaches have previously been adopted for removing mercury from gas streams. These techniques include passing the gas stream through a fixed or fluidized sorbent bed or structure or using a wet scrubbing system. Approaches using fixed bed technologies normally pass the mercury containing gas through a bed consisting of sorbent particles or through various structures such as honeycombs, screens, or fibers that are coated with a sorbent. Common sorbents include activated carbon and noble metals such as gold and silver. In many cases where noble metals are used, the structure is coated with the noble metal sorbent while the support underneath is made of ceramic or metallic materials. The sorbents in these fixed structures can be periodically regenerated by heating the structure and driving off the adsorbed mercury (see, for example, U.S. Pat. Nos. 5,409,522 and 5,419,884, which are incorporated herein by reference in their entireties). The mercury driven off can then be recovered or removed separately.

However, in regenerating the sorbent in such fixed bed systems, the bed must be taken off-line periodically. This necessitates that a second bed be used and remain on-line while the first one is regenerating. In addition, the beds need to be located downstream of a primary particulate collection device to remove all of the solid suspended particles in the gas stream and to avoid pluggage. These fixed bed systems also require significant space and are very difficult to retrofit into existing systems, such as into the ductwork of power plants, without major modifications and high pressure drop penalties (e.g., 10–30 inches of water).

U.S. Pat. Nos. 5,948,143 and 6,136,072, which are incorporated herein by reference in their entireties, describe concepts that addressed some of these problems through the use of porous tubes and plates that can be regenerated and cleaned while in the presence of flue gas containing particles. These porous tubes and plates are cleaned by a series of back pulses across their walls. However, the fabrication of porous tubes and plates is complex and relatively expensive. The tubes and plates are also heavy and difficult to install and heat due to the thick wall requirements.

Therefore, a need remains for a cost-effective method of removing trace contaminants, in particular mercury, from the flue gas of a combustion system. Specifically, there is a need for a fixed bed process for removing such contaminants that can be easily retrofitted into an existing combustion process, easily cleaned to avoid plugging, and easily regenerated.

SUMMARY OF THE INVENTION

The present invention provides a method and apparatus for removing trace contaminants from a gas stream or flue gas. In one embodiment, the present invention an apparatus for removing a trace contaminant from a gas stream, comprising a gas duct configured to receive a gas stream comprising a trace contaminant; a plurality of substrates disposed within the gas duct; a trace contaminant sorbent disposed on at least a portion of each of the substrates; an isolation device for separating the portion of each of the substrates from the gas stream; and a regenerator for regenerating the trace contaminant sorbent.

In another embodiment, the present invention comprises a method for removing a trace contaminant from a gas stream, comprising passing a gas stream comprising a trace contaminant through a gas duct; contacting the trace contaminant with a trace contaminant sorbent disposed on at least a portion of a substrate within the gas duct; adsorbing the trace contaminant with the trace contaminant sorbent; isolating the portion of the substrate from the gas stream; cleaning the substrate in-situ and concurrently with the passing of the gas stream through the gas duct; and regenerating the trace contaminant sorbent in-situ and concurrently with the passing of the gas stream through the gas duct.

In another embodiment, the present invention comprises one or more substrates having a trace contaminant sorbent thereon positioned inside of an electrostatic precipitator or downstream of an electrostatic precipitator, where, for example, a substrate having a trace contaminant sorbent thereon may be used in place of an electrically-charged plate typically used in the ESP. In another embodiment, the present invention comprises one or more substrates having a trace contaminant sorbent thereon positioned inside of a baghouse, where, for example, the substrate may be used in place of a filter bag cage or the filter cloth, or positioned near the outlet of each filter bag, or placed to cover all or a portion of the outlet of a plurality of filter bags. In another embodiment, the present invention comprises one or more substrates having a trace contaminant sorbent thereon positioned downstream of a baghouse, for example, near the outlet of the baghouse.

In another embodiment, the present invention comprises one or more substrates having a trace contaminant sorbent thereon positioned in the mist eliminator section of a wet scrubber, wherein the substrates also act as a mist eliminator. In another embodiment, the present invention comprises one or more substrates having a trace contaminant sorbent thereon positioned upstream or downstream of a mist eliminator in a wet scrubber.

In another embodiment, the present invention comprises a substrate that is disposed within the gas duct, wherein the substrate is itself constructed of a sorbent material.

The present invention provides a cost-effective method of removing trace contaminants, in particular mercury, from the flue gas of a combustion system. Specifically, the present invention provides a fixed bed process for removing such contaminants that can be easily retrofitted into an existing combustion process, easily cleaned to avoid plugging, and easily regenerated.

These and other features of the present invention will appear from the following description from which the preferred embodiments are set forth in detail in conjunction with the accompanying drawings.

BRIEF DESCRIPTION OF THE DRAWINGS

FIG. 6 is a side view of the embodiment of FIGS. 4 and 5;

FIG. 7 is a perspective view of another embodiment according to the present invention;

FIG. 17 illustrates another process in which the present invention may be utilized.

DETAILED DESCRIPTION OF THE PREFERRED EMBODIMENTS

Figure 1:
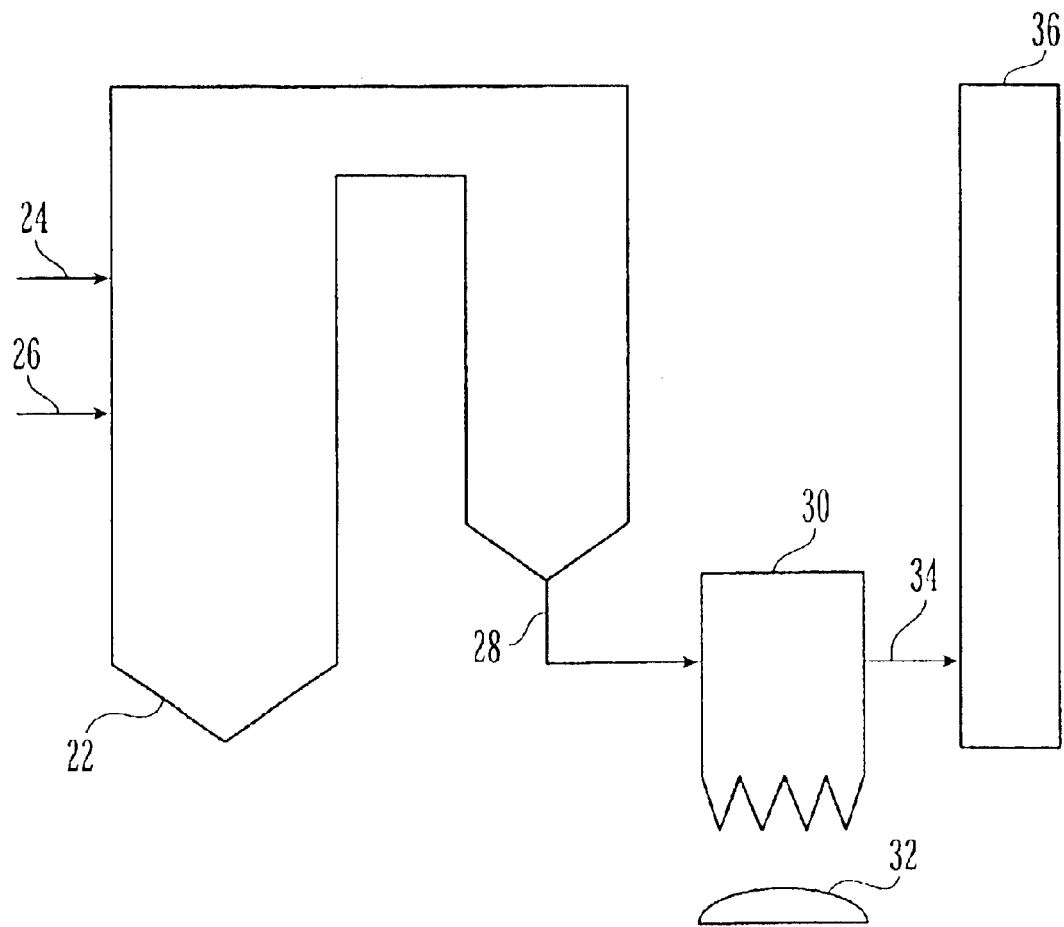
FIG. 1 illustrates one exemplary process in which the present invention may be utilized.

FIG. 1 illustrates one exemplary process in which the present invention may be utilized. A combustion device, such as a fossil-fuel-fired boiler 22, receives air through an air inlet duct 24 to combust fuel, such as coal received through a fuel inlet duct 26. The combustion process within the boiler 22 produces a gas stream in the form of flue gas that exits the boiler 22 through an outlet duct 28. The flue gas produced within the boiler 22 is comprised of air, products of combustion in the gaseous form, such as water vapor, carbon dioxide, oxides of nitrogen and sulfur, halides, organic compounds, mercury, selenium and other trace metal vapors or trace contaminants, and particulate matter. A particulate collection device 30 is connected to the outlet duct 28 and removes particulate matter 32 from the flue gas.

The particulate collection device outlet duct 34 directs the flue gas to the stack 36 where it is discharged. It should be appreciated that some systems may not utilize a particulate collection device and that the outlet duct 28 would simply connect with the particulate collection device outlet duct 34.

In accordance with one embodiment of the present invention, a substrate having a trace contaminant sorbent disposed on at least a portion of the surface of the substrate is placed within a gas duct of a process, such as the one described in connection with FIG. 1, that transports flue gas, or through which flue gas passes, wherein the flue gas comprises a trace contaminant that is to be removed or the concentration of which is to be reduced. In a preferred embodiment, the present invention is directed to a plurality of substrates in a gas duct, each having a trace contaminant sorbent disposed on its surface for removal of trace contaminants from a gas stream, such as mercury, wherein relatively high removal of the trace contaminant is achieved at relatively high gas velocities, such as those experienced in an existing gas duct in the process described in accordance with FIG. 1, and at a acceptable pressure drop. It should be appreciated that removal of a trace contaminant is intended to mean at least a reduction in the concentration of the trace contaminant in the flue gas and does not necessarily mean complete removal of all of a particular trace contaminant.

It should be appreciated that, in general, the substrate may be located anywhere in the gas duct of a given process where it is desirable to remove a particular trace contaminant from a flue gas. It should be also appreciated that any number of substrates may be used in either the same general location or in different locations and each of these substrates may have the same, similar, or different shapes and sizes. Moreover, each of these substrates may utilize the same, different, or a mixture of trace contaminant sorbents. The remainder of this description, however, will be presented in the context of the process described in FIG. 1; however, this should not be construed as a limitation on the processes for which the present invention may be used.

Referring back to FIG. 1, the substrate may be placed anywhere in the gas duct, such as at any point along outlet duct 28, particulate collection device outlet duct 34, or the stack 36. One of skill in the art will appreciate the parameters that influence trace contaminant removal, and in particularly, mercury removal, to aid in appropriately selecting the location for the substrate. For example, since lower temperatures (e.g., less than 500° F. and more preferably 150–350° F.) favor mercury adsorption from flue gas streams, the substrate would ideally be located downstream of the airheater in a coal-fired power plant.

The size and shape of the substrate is determined, in part, upon the size and shape of the gas duct into which it is placed. It should be appreciated that the present invention may easily be used as a retrofit in existing processes such as the one described in connection with FIG. 1. In such a retrofit, it would be desirable to utilize existing ductwork for the substrates of the present invention rather than replacing existing ductwork to accommodate a pre-designed substrate or substrates. Therefore, the size and shape of the substrates would be determined based upon the size of the existing ductwork.

The size and shape of the substrate would also be determined, in part, on maximizing contact between the flue gas and the substrate, avoiding or minimizing deposition of particulate and ash in the flue gas on the substrate, and minimizing gas flow pressure drop across the substrate. For example, in connection with the process of FIG. 1 or a similar fossil fuel-fired combustion process, locating the substrate downstream of an existing electrostatic precipitator (ESP) or baghouse will reduce the amount of ash in the gas stream to which the substrate is exposed. Further, locating the substrate downstream of a combination spray dryer-ESP, spray-dryer-baghouse, or wet scrubber will also reduce the amount of acid gas to which the substrate is exposed. All of these considerations will improve the longevity and operation of the substrate and the performance of the trace contaminant sorbent.

As noted, the size and shape of the substrate would be selected to effect the most contact between the gas and the surface of the substrate while minimizing particle deposition and fouling of the plate as well as gas flow resistance or pressure drop. For example, if a plurality of substrates of the present invention were sized to be used in an existing duct that was relatively small, the length of the substrates could be extended to provide the necessary surface area to achieve the desired trace contaminant removal. Preferably, the substrate has a high surface area, such as approximately 1–100 $ft^2$ of surface area per $ft^3/s$ of gas flow, more preferably approximately 1–50 $ft^2/ft^3/s$, and most preferably approximately 10 $ft^2/ft^3/s$.

Lastly, it should be appreciated that the substrate may be placed within a gas duct in any orientation. One of skill in the art will appreciate that the orientation of the substrate will be dependent upon many factors, including, for example, the size, shape, and number of substrates, the size and shape of the gas duct itself, the desired contact between the substrate and the flue gas, and the pressure drop across the substrate. One of skill in the art will appreciate how to optimize these and other factors to determine such placement and orientation of the substrate within the gas duct.

In a preferred embodiment, the substrate is a flat, thin plate coated with a trace contaminant sorbent. A typical plate size may be 1–20 feet in length, a height substantially the same as the height of the gas duct into which it is placed, and a thickness of 0.1–1 inch. Such a plate may be made from any appropriate material sufficient to retain a trace contaminant sorbent on its surface and capable of withstanding the flue gas environment into which it is placed. Preferably, such a plate or other substrate may, for example, be made of any metal, including steel, or ceramic.

It should be appreciated that any sorbent may be disposed on the substrate; however, the choice of sorbent will be dependent upon the trace contaminant to be removed, including its physical properties and characteristics. For example, gold is a preferred sorbent for use in the removal of mercury from the flue gas since it readily forms an amalgam with mercury. Other metals that form amalgams with mercury, such as silver and zinc, are also preferred. The sorbent may consist of a single layer of the selected trace contaminant sorbent or of multiple layers of either the same or different sorbents, such as gold plated over silver or zinc. A preferred embodiment comprises gold as the trace contaminant sorbent on a metal substrate or metal or plate. Another preferred embodiment comprises gold as the trace contaminant sorbent coated over layers of silver or zinc coated on a metal substrate. By coating the gold over silver or zinc, less gold is necessary since absorbed mercury will also form an amalgam with the underlying silver or zinc; however, the gold may act to protect the silver or zinc from corrosion. In this embodiment, the gold layer may be on the order of 1 or a few microns in thickness. One of skill in the art will appreciate that the application of the sorbent to the substrate can be performed by various methods known in the art, depending upon the particular sorbent and the particular substrate used, such as electroplating or metal vapor deposition. In a preferred embodiment, the substrate is either a metal or ceramic flat plate, as described above, that is coated with 0.1–100 µm thick layer of trace contaminant sorbent, such as gold or other trace contaminant sorbents, such as silver, zinc, activated carbon, or any other sorbent selected for removal of a specific trace contaminant.

While the substrate has been discussed as being made of a metal or ceramic, it should be recognized that the substrate may be made of any material on which a trace contaminant sorbent may be disposed. Also, the material used to construct the substrate must be able to withstand the flue gas conditions to which it will be exposed. In another embodiment, however, the substrate may be made from the trace contaminant sorbent material itself, which avoids the step of disposing a trace contaminant material onto the substrate. For example, the substrate may be made from an activated carbon or carbon fiber material. When the substrate is made from the trace contaminant material itself, the substrate needs to have sufficient integrity to remain intact during operation. One of skill in the art will recognize how to make a substrate with sufficient integrity from a material such as a trace contaminant sorbent using methods known in the art. It should be appreciated that the above as well as the following embodiments are described in terms of a substrate having trace contaminant sorbent disposed thereon; however, any of these embodiments may utilize a substrate made from the trace contaminant sorbent itself. Therefore, the discussion of each embodiment should not be construed as limited to the use of a substrate having a trace contaminant sorbent disposed thereon and may alternatively, or in combination, be used with a substrate made from a trace contaminant sorbent material itself.

Figure 3:
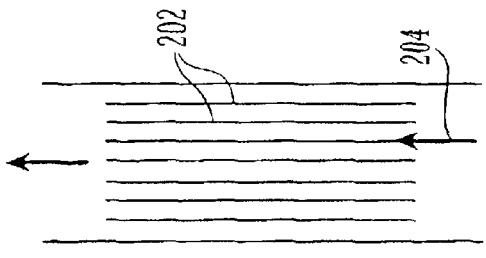
FIG. 3 is a top view of the embodiment of FIG. 2.
Figure 2:
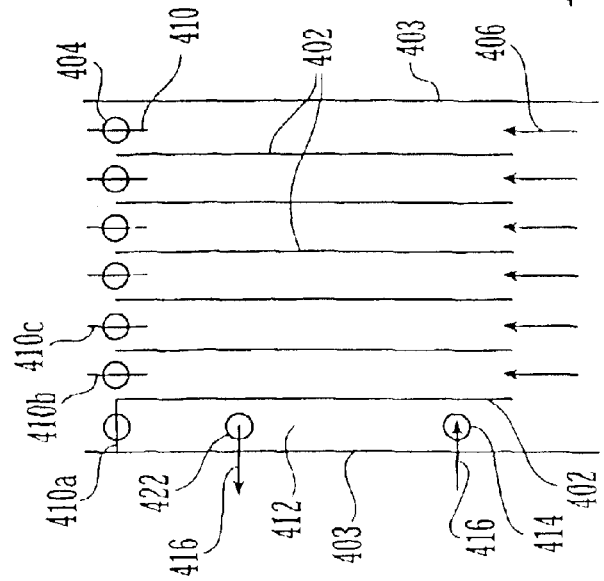
FIG. 2 is a perspective view of one embodiment of the present invention.

FIG. 2 is a perspective view of one embodiment of the present invention and FIG. 3 is a top view of the embodiment of FIG. 2. FIGS. 2 and 3 illustrate a plurality of substrates 202 according to one embodiment of the present invention. In this preferred embodiment the plurality of substrates 202 are preferably flat metal plates that are positioned approximately parallel to the direction of flue gas flow 204 through the gas duct (not shown) and to one another. In this embodiment the pressure drop across the plates is minimized because of the shape of the substrates 202 and their orientation inside of the gas duct with respect to the direction of gas flow 204. As noted above, a preferred size for these metal plates is 1–20 feet long with a height substantially equivalent to the height of the gas duct. A preferred spacing between each of the metal plates is approximately 0.1–20 inches. More specifically, each plate is positioned approximately 0.1–20 inches from an adjacent plate and preferably 0.2–2 inches. It is also preferred to maintain a pressure drop across such a plurality of metal plates of less than 10 inches of water and more preferably less than 5 inches of water at gas velocities of greater than 5 ft/s and more preferably at greater than 20 ft/s. In other words, a preferred embodiment includes a plurality of metal, flat plates oriented substantially parallel to the direction of gas flow through the duct, which may be an existing gas duct in a process such as that described in connection with FIG. 1, wherein the plates are positioned either upstream or downstream of a particulate collection device, the gas velocities are relatively high, such as greater than 5 ft/s and preferably greater than 20 ft/s, but wherein the pressure drop is acceptable, such as less than 10 inches of water and preferably less than 5 inches of water. More preferably, these plates are used for mercury removal and, therefore, utilize gold or activated carbon coated on the plates as the trace contaminant sorbent.

Figure 5:
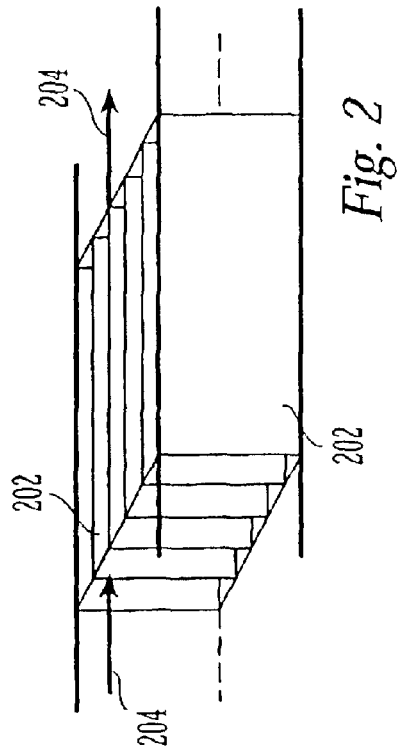
FIG. 5 is a top view of the embodiment of FIG. 4.
Figure 4:
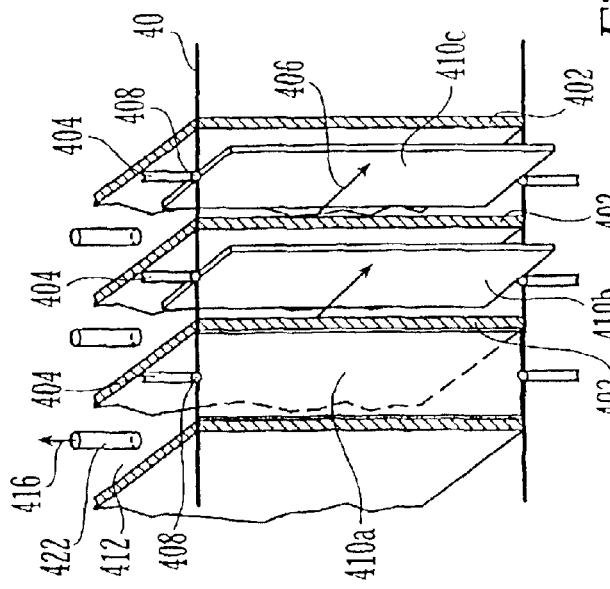
FIG. 4 is a perspective view of another embodiment of the present invention.

FIG. 4 is a perspective view of another embodiment of the present invention, and FIG. 5 is a top view of the embodiment shown in FIG. 4. More specifically, FIG. 4 illustrates a plurality of substrates 402, which in this embodiment are preferably flat metal plates arranged substantially parallel to one another. As noted, FIG. 5 is a top view of these substrates 402 and actually illustrates more substrates 402 than shown in FIG. 4. In this arrangement, the substrates 402 and the gas duct walls 403 essentially form channels through which the gas flow 406 may pass. In this embodiment, however, an isolation device 404 can be used to stop the passage of gas flow 406 through any given channel or past any given side of a substrate 402. As shown in FIG. 4, the isolation device comprises a damper valve 408 and an isolation door 410 that is opened and closed by operation of a corresponding damper valve 408. As shown in FIGS. 4 and 5 one isolation door 410a is shown in the closed position and two isolation doors 410b, 410c are shown in the open position, noting that the additional isolation doors 410 in FIG. 5 are also shown in the open position.

In operation, when the isolation device 404 is in the open position, the isolation door 410 is oriented substantially parallel to the gas flow 406 and thereby allows the gas flow 406 to travel within the corresponding channel. In other words, the gas flow 406 passes between and in contact with two sides of adjacent substrates 402 that form a channel corresponding to the isolation door 410 that is in the open position. More specifically, the gas flow 406 is free to pass between two corresponding sides of two substrates 402, or, in the case where the substrate 402 is located next to the gas duct wall 403, along one corresponding side of a substrate 402 and the gas duct wall 403. When the isolation device 404 is in the closed position, the isolation door 410 prevents the passage of the gas flow 406 through that corresponding channel, thereby isolating one particular side of a substrate 402 and one particular side of an adjacent substrate 402, or, in the case where the substrate 402 is located next to the gas duct wall 403, isolating only that corresponding side of the substrate 402.

This feature is particularly useful for cleaning the substrate or regenerating the trace contaminant sorbent without having to stop the flow of gas through the duct or without having to stop or divert the gas flow through the entire structure of substrates, as will be further described below. In particular, this feature allows the isolated sides of the substrates 402 to be cleaned in-situ, that is without removing them from the gas duct, and the trace contaminant sorbent on those isolated sides can be regenerated in-situ, again without removing the trace contaminant sorbent or substrate from the gas duct. Moreover, this cleaning and regeneration can be performed concurrently with the gas flow 406 moving past the sides of the substrates 402 that have not been isolated.

It should be appreciated, however, that the isolation device 404 and the damper valves 408 may be controlled and activated by any known control system known in the art. Further, more than one isolation device may be activated at the same time or they may be activated in a predetermined, controlled sequence based upon a predetermined set of parameters or measurements. It should also be appreciated, as noted, that one or more isolation devices 404 may be activated and put into the closed position, while the remaining isolation devices 404 remain in the open position, thereby allowing the gas flow 406 to flow concurrently while certain isolation devices 404 are in the closed position and others are in the open position.

It should be appreciated that a cleaning mechanism may be added to clean any type of substrate or substrates used in the present invention. Further, the cleaning mechanism and the method used to clean the substrate or substrates of the present invention may be any cleaning mechanism or method known in the art; however, it should be appreciated that the cleaning mechanism is an optional part of the present invention. For example, a mechanical rapping device or a high pressure air jet may be used to dislodge accumulated particulate matter on the substrate. Furthermore, such cleaning mechanism may be activated and used in conjunction with the operation of the isolation device. That is, upon activating the isolation device, the corresponding side of the substrate that has been isolated may be cleaned using the cleaning mechanism. Moreover, such cleaning may be performed in-situ and concurrent with the flow of flue gas past the other non-isolated substrates.

It should also be appreciated that the present invention may further comprise a regenerator for regenerating the trace contaminant sorbent on the substrate. Such a regenerator may comprise any device capable of desorbing the sorbed trace contaminant from the trace contaminant sorbent. For example, a regenerator may comprise an electrical resistance heater attached to each substrate for heating the substrate to a given temperature at which any trace contaminant is desorbed from the trace contaminant sorbent. Another example of a regenerator is a device capable of providing a hot gas stream that is passed by the substrate and desorbs the trace contaminant from the trace contaminant sorbent based upon the gas stream's temperature. It should be appreciated that the regenerator may be used separately or in combination with the cleaning mechanism. Moreover, such regeneration may be utilized in conjunction with the operation of the isolation device. That is, upon activating the isolation device, the trace contaminant sorbent on the corresponding side of the substrate that has been isolated may be regenerated. Moreover, such regeneration may be performed in-situ and concurrent with the flow of flue gas past the other non-isolated substrates.

As noted, one example of a regenerator comprises a heater for heating the substrate, such as an electrical resistance heating device attached to each substrate. In operation, the substrate would be heated upon activation of the electrical heater to a temperature at which any adsorbed trace contaminant would be desorbed from the trace contaminant sorbent. This regeneration could be performed in-situ, that is without removing the substrate from the gas duct. This regeneration could also be performed while the flue gas was not flowing through the gas duct or in conjunction with the isolation device whereby only those isolated substrates, or only those particular isolated sides of certain substrates, are heated to desorb any adsorbed trace contaminant. The desorbed trace contaminant can then be collected by a gas stream that is passed by the isolated sides of those substrates being regenerated. This gas stream can then be routed to a secondary recovery system where the desorbed trace contaminant is collected, concentrated, and disposed of by methods well known in the art. Once the trace contaminant sorbent has been regenerated it is capable of being placed back in service.

FIG. 6 is a side view of the embodiment shown in FIGS. 4 and 5. Specifically, FIG. 6 illustrates one embodiment of a regenerator according to the present invention. Isolation door 410a is shown in the closed position. As such, the corresponding channel has been isolated from the flue gas flow 406. More specifically and with reference to FIGS. 4 and 5, side 402a of one substrate 402 has been isolated (as has the wall of the gas duct 403 adjacent side 402a). With reference to FIG. 6, the inlet regeneration gas duct 414 receives regeneration gas 416, such as hot gas comprising air or steam, from a physically separate regenerator (not shown). Upon isolation of the channel 412 or upon closure of the isolation door 410a, the inlet regeneration gas valve 418 is opened, which permits the inlet regeneration gas 416 to enter this isolated channel 412. In addition, the outlet regeneration gas valve 420 is opened in the outlet regeneration gas duct 422 to permit the regeneration gas 416 to exit the isolated channel 412. The pressure of the regeneration gas 416 within the isolated channel 412 must be high enough to keep the flue gas from entering this isolated channel 412. It should be appreciated, however, that the flue gas itself may also be used as the regeneration gas, in which case, the substrate would simply be heated to desorb the collected trace contaminant. It should also be appreciated that the inlet and outlet regeneration gas valves should be positioned appropriately to avoid or minimize short-circuiting the regeneration gas as it flows through the isolated channel.

As the regeneration gas 416 passes beside and contacts the isolated side 402a of the substrate 402, any adsorbed trace contaminant is desorbed from the trace contaminant sorbent and carried with the regeneration gas 416 through the outlet regeneration gas duct 422. As noted above, after exiting the isolated channel 412, the regeneration gas 416 may be sent to a separate secondary recovery system where the trace contaminant is removed, concentrated, and disposed of by any known method in the art. It should be appreciated that the regenerator and its operation described in connection with FIGS. 4, 5, and 6 would allow the trace contaminant sorbent on each of the substrates to be regenerated in-situ and concurrent with the flue gas flowing through non-isolated channels.

In general operation of the present invention, a trace contaminant would be removed upon contacting the flue gas and, therefore, the trace contaminant, with the trace contaminant sorbent disposed on the substrate, such as a plate. Upon such contact, the trace contaminant would adsorb onto the sorbent. With respect to the removal of mercury, for example, upon contact between the trace contaminant mercury and the trace contaminant sorbent selected to remove mercury, for example, gold, the mercury would be adsorbed on the trace contaminant sorbent on the substrate surface as the flue gas passes over the substrate. In the case of gold, it should be appreciated that the adsorbed mercury reacts with the gold to form an amalgam.

As the substrate surface gets fouled with dust particles from the gas stream, it can be cleaned, preferably in-situ (i.e., without having to remove the substrate from the duct) and during continued operation of the main process (i.e. without stopping the flow of the flue gas, that is, concurrently with the flow of gas through the gas duct). This allows process operation to continue uninterrupted while the substrates or plates, or at least a portion of them, are cleaned. Cleaning may be conducted by mechanically rapping, by directing a high pressure air jet toward the substrate surface to knock the dust or particulate matter off of the surface, or by any other method known in the art. It should be appreciated that such cleaning may be performed at any time or at a particular, predetermined time, for example, at a point where a given amount of particulate matter has attached to the substrate such that contact between the trace contaminant and the trace contaminant sorbent has been significantly adversely affected or reduced.

When the surface of the trace contaminant sorbent becomes saturated with the trace contaminant, the sorbent may be regenerated. In one embodiment, this regeneration may be accomplished by heating the sorbent using electric heaters, steam or the flue gas itself, to desorb the trace contaminant followed by collection of the desorbed contaminant in a secondary recovery system. For example, with respect to removal of mercury, metal plates may be used as the substrate with gold as the trace contaminant sorbent. In this case the plates and the gold sorbent can be regenerated by heating the plates so that the mercury desorbs since the formation of an amalgam is a relatively easily reversible reaction. It should further be appreciated that mercury can be easily desorbed from activated carbon upon heating as well. Any mercury desorbed from the plates can be recovered in a secondary system for later containment through condensation or other storage mechanism or process.

In a preferred embodiment, such regeneration may be conducted in-situ and concurrent with the flow of flue gas through the gas duct. For example, the regeneration can take place within the gas stream by isolating some or all of the substrates via the use of an isolation device, such as a system of damper valves as described in connection with FIGS. 4 and 5.

FIG. 7 is a perspective view of another embodiment according to the present invention. While embodiments described above relate to the ability to clean the substrate and regenerate the trace contaminant sorbent in-situ and concurrent with the flow of flue gas through non-isolated sections, FIG. 7 shows an alternative approach. In this embodiment, the substrates 702 are preferably flat, thin, metal plates arranged substantially parallel to one another. However, in this embodiment, there are two sets or cartridges of these substrates 704, 706. In this configuration, one set or cartridge of substrates may be removed from the system for cleaning and regeneration while the other set is in use. As such, the process flue gas need only be shut down to permit removal of one of the sets of substrates 704, 706, or alternatively, a gas bypass arrangement may be made such that the process flue gas does not need to be shut down at all. Once removed, one set of substrates could be easily cleaned and regenerated by any method known in the art. In this embodiment, it is important to design the substrates such that one set alone will provide the required removal of a given trace contaminant. It should be appreciated that more than two sets of substrates may be used such that several smaller sets of substrates are used thereby facilitating easier removal, cleaning, regeneration, and replacement.

Figure 9:
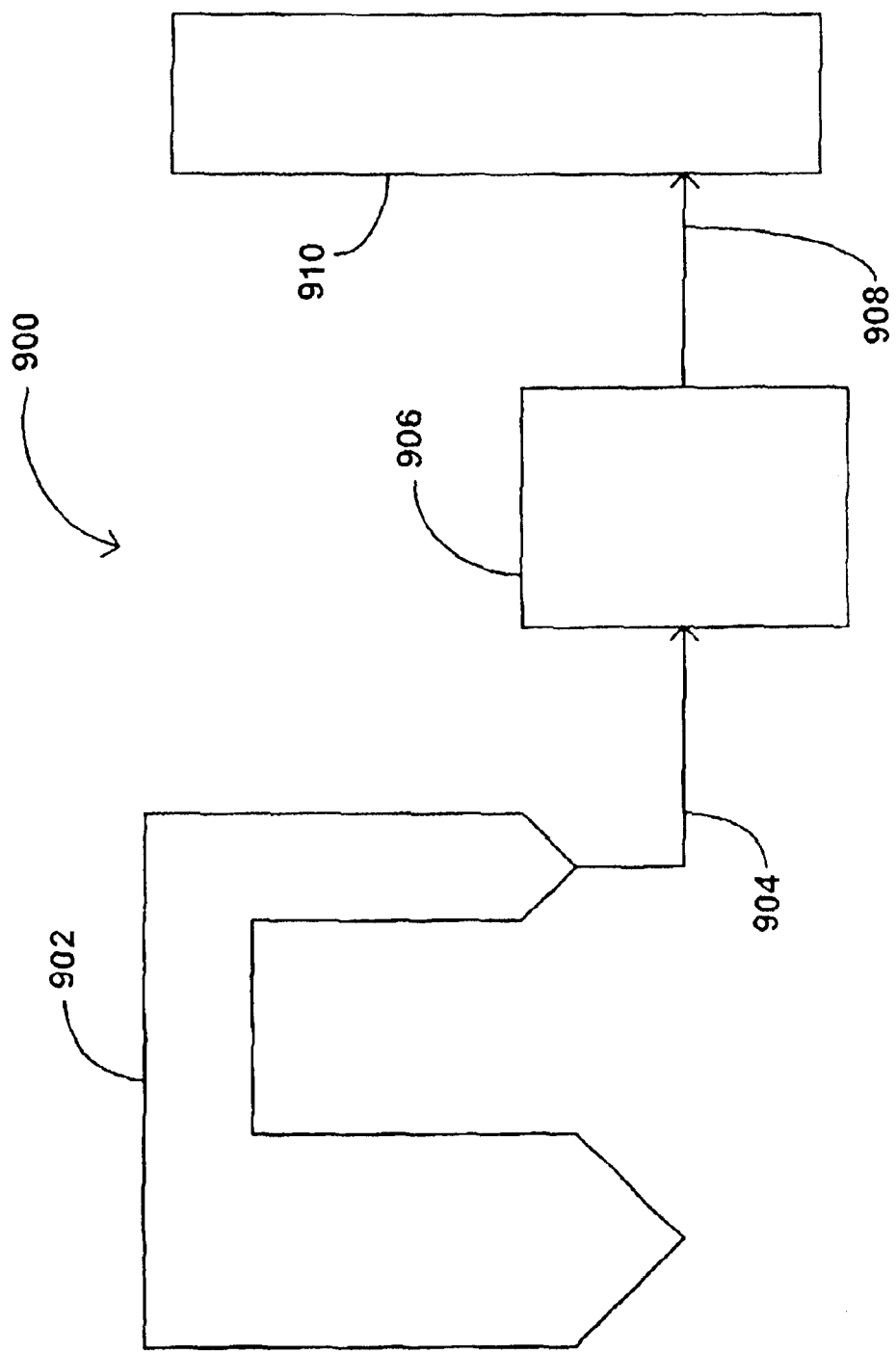
FIG. 9 illustrates another process in which the present invention may be utilized.

FIG. 9 illustrates another process in which the present invention may be utilized. The process 900 is similar to that shown in FIG. 1 in that it comprises a fossil-fuel-fired boiler 902 that produces a flue gas stream that exits the boiler through outlet gas duct 904. In this case, however, the particulate collection device is specifically an ESP 906. The flue gas exits the ESP and is directed to a stack 910 through ESP outlet duct 908.

Figure 10:
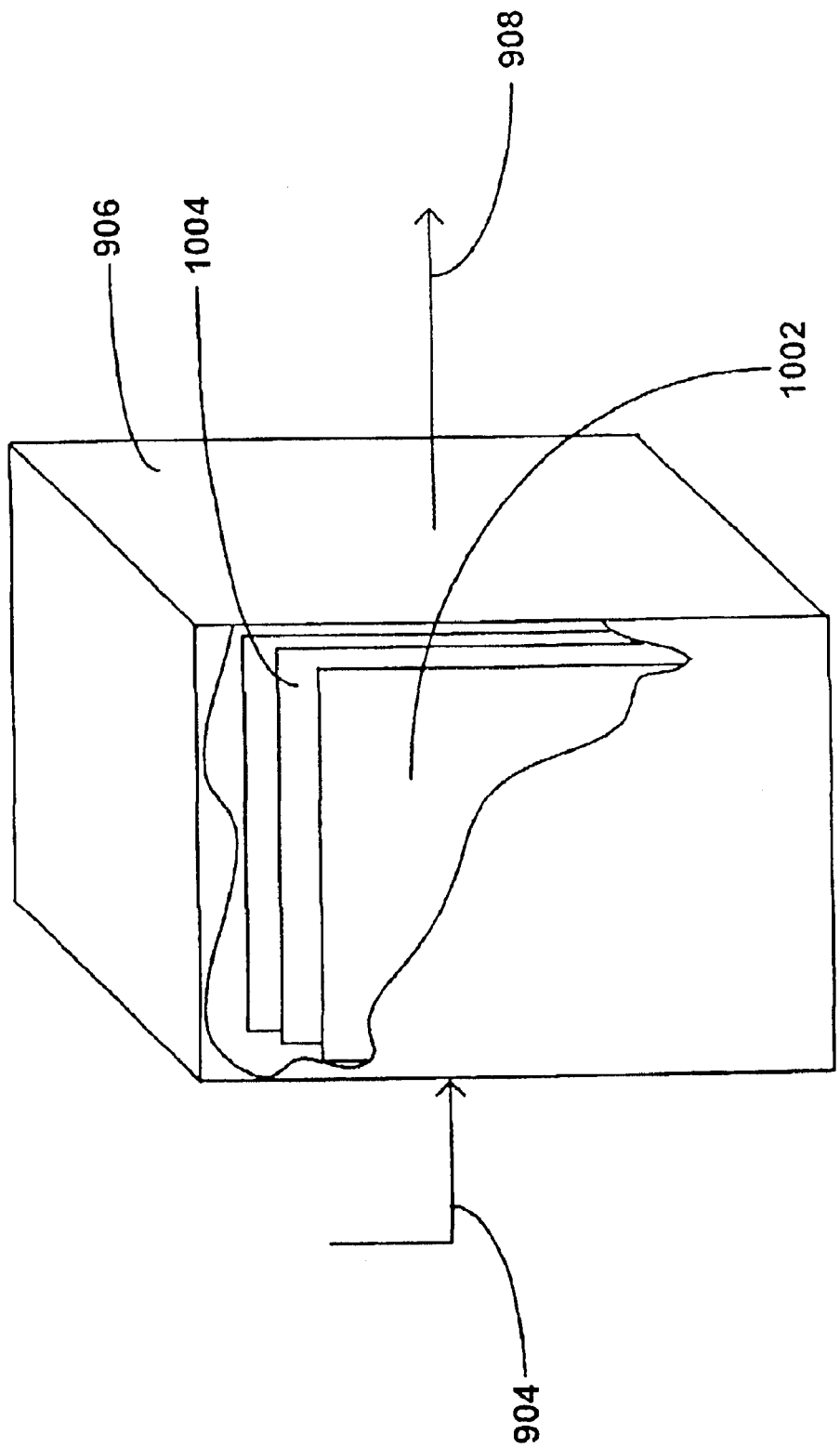
FIG. 10 is a perspective view of the electrostatic precipitator of the process of FIG. 9 according to one embodiment of the present invention.

FIG. 10 is a perspective view of the ESP 906 of the process of FIG. 9 according to one embodiment of the present invention. A partial cut-away is shown of the ESP 906, which illustrates substrates 1002, 1004 having a trace contaminant sorbent thereon, in this case plates, which have replaced electrically-charged plates typically used in the ESP for particulate collection. In operation, the gas will pass by the plates 1002, 1004 and trace contaminants present in the gas can be adsorbed onto the sorbent. It should be appreciated that any one or more of any of the electrically-charged plates typically used in the ESP may be replaced with a substrate having a trace contaminant sorbent thereon; therefore, the illustration shown in FIG. 10 should be viewed as exemplary only. In addition, it should be appreciated that the substrate may also be constructed of trace contaminant sorbent material itself rather than comprising an underlying substrate with sorbent material applied thereon.

Further, it should be appreciated that gas flow vanes (not shown) may also be used in an upstream portion of the ESP. In this case, one or more of these gas flow vanes may also be replaced, in addition to replacing one or more of the ESP plates, with a substrate having a trace contaminant sorbent thereon, or made from a trace contaminant sorbent, according to the present invention. Alternatively, rather than replacing any of the ESP plates, it is possible to just replace one or more of the gas flow vanes with a substrate having a trace contaminant sorbent thereon or made from such a sorbent.

It should be appreciated that either the substrate in the ESP or used as gas low vanes may also be configured to be cleaned and/or regenerated as described previously, such as by using a cleaner mechanism and/or regenerator may be sued. For example, the substrates in the ESP may be cleaned as ordinary electrically-charged plates in an ESP are cleaned. Also, the substrates may be isolated to regenerate the sorbent in-situ using an isolation device as described above.

Figure 11:
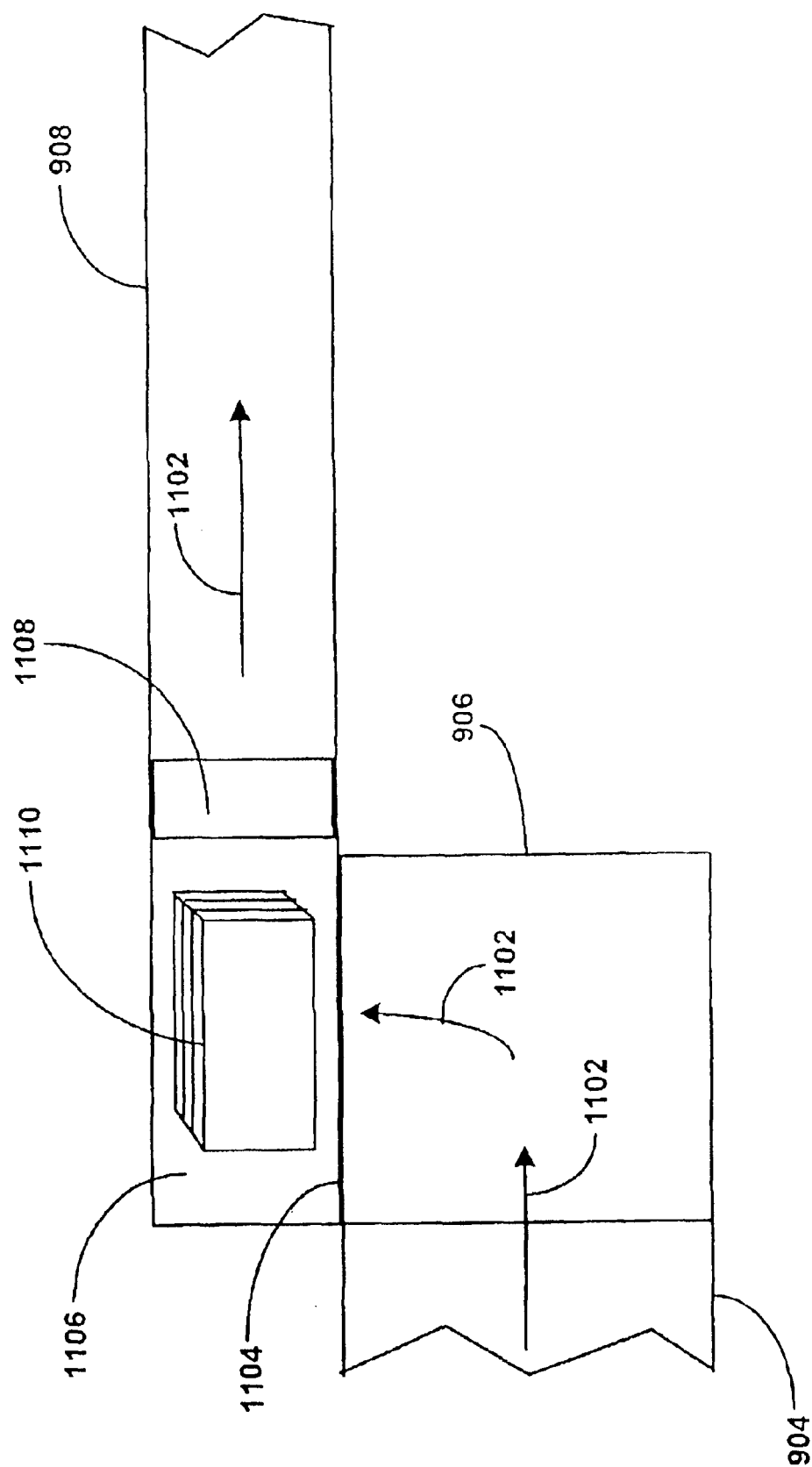
FIG. 11 illustrates another process in which the present invention may be utilized.

FIG. 11 illustrates another process in which the present invention may be utilized. This embodiment is similar to the process shown in FIG. 9 in that an ESP 906 is used as the particulate collection device. In this embodiment, the flue gas 1102 passes from the outlet gas duct 904 to the ESP 906. The flue gas then passes into the ESP outlet duct 908. That portion of the ESP outlet duct 908 adjacent to the ESP is referred to as the outlet damper valve chamber 1106. A damper valve 1108 is position between the outlet damper valve chamber 1106 and the remaining portion of the ESP outlet duct 908 and can be used to isolate the ESP 906 from the ESP outlet duct 908. In this embodiment, a plurality of substrates 1110 having trace contaminant sorbent thereon are positioned within the outlet damper valve chamber 1106. Preferably, each of the substrates comprises, for example, a plate as described in connection with FIG. 2. It should be appreciated that the substrate may also be constructed of trace contaminant sorbent material itself rather than comprising an underlying substrate with sorbent material applied thereon.

In operation, the flue gas 1102 exits the ESP 1106 and passes by the substrates or plates 1110 resulting in adsorption of trace contaminants present in the flue gas 1102. It should be appreciated that in this embodiment the gas flow velocity in the outlet damper valve chamber is relatively slower. Therefore, the substrate or plates may be construed to be relatively shorter than if plates were used in a section of ductwork where the gas velocity was relatively higher. Because the gas velocity is relatively slower, the same contact time between the gas and the trace contaminant sorbent may be achieved with relatively shorter plates.

Figure 12:
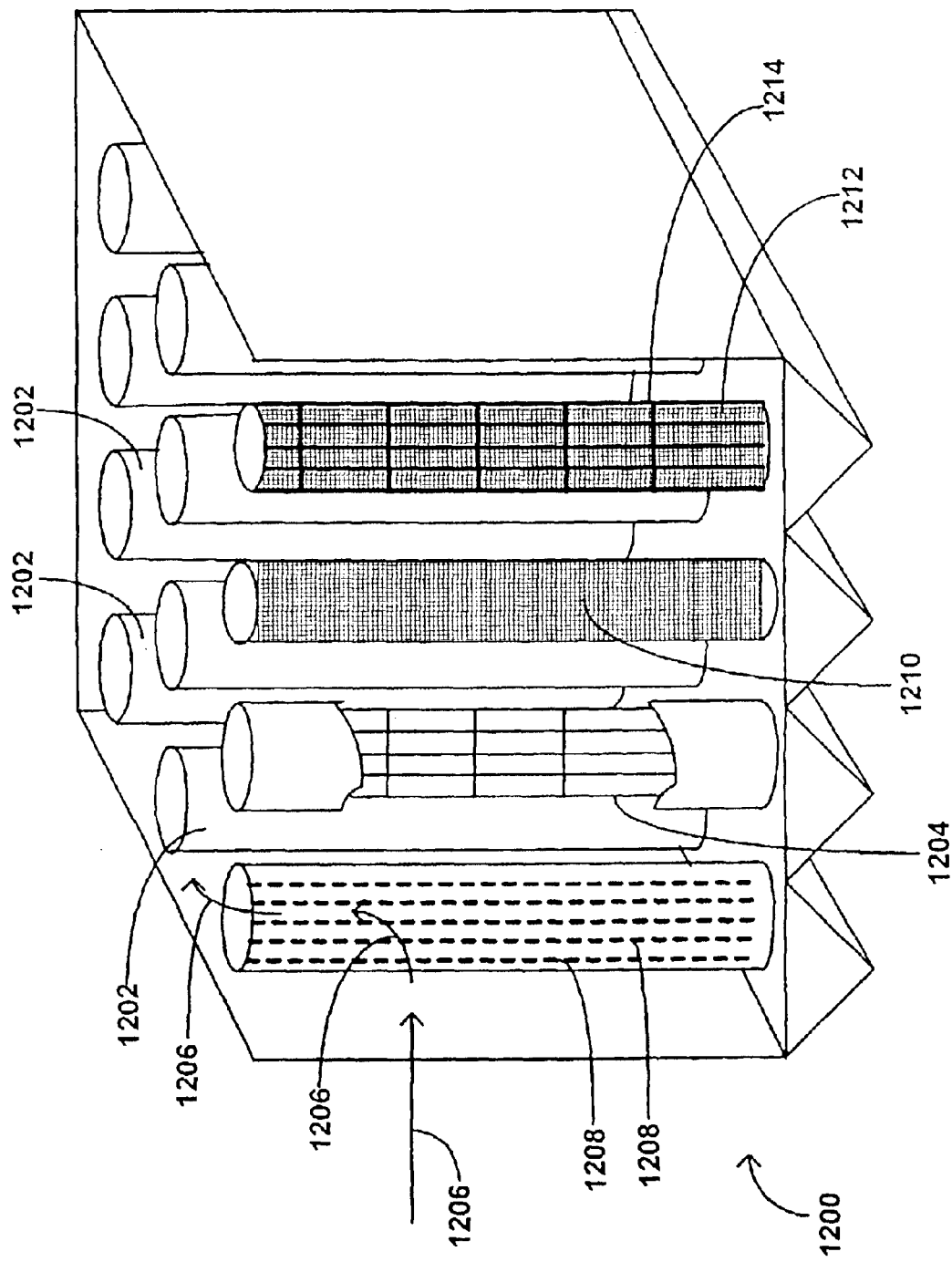
FIG. 12 is a partial perspective, cut-away view of a baghouse illustrating various embodiments according to the present invention.

FIG. 12 is a partial perspective, cut-away view of a baghouse illustrating various embodiments according to the present invention. Baghouse 1200 is illustrated with a plurality of bags 1202 that are typically supported by cages 1204. Flue gas 1206 is typically introduced into the baghouse 1200 and passes from the outside of each bag 1202, through the bag 1202, and out through the top or bottom of the bag 1202 (illustrated for one bag only). However, the baghouse 1200 may also be a reverse-gas baghouse in which the gas flow is introduced from either the top or bottom of the bag into its interior and then passes through the bag and out the sides of the bag into the chamber housing the bags.

A substrate having a trace contaminant sorbent thereon may be used in conjunction with the bags 1202 and cages 1204 in a variety of ways, which are separately shown in FIG. 12. In one embodiment, the substrate may be in the shape of a cylindrical rod 1208 that extends from the top to the bottom of the bag or cage. Such a rod 1208 may be used in conjunction with a cage (not shown) or alone such that the rods act to support a bag. In operation, the gas passes from the outside of the bag into its interior and flows past the rods having trace contaminant sorbent, which allows trace contaminants to be adsorbed by the sorbent.

In another embodiment, instead of using a substrate such as rods, a wire mesh material 1210, such as chicken wire, that is rolled in the shape of a tube may be used. In this embodiment, the wire mesh 1210 may completely replace the bag 1202 and its cage 1204. In operation, as gas is passed into the baghouse 1200, it will flow past the wire mesh allowing trace contaminants to be adsorbed onto the trace contaminant sorbent. Similarly, a substrate 1212 such as this wire mesh may be used in conjunction with a cage 1214 and/or a bag 1202 as well. In this configuration, the substrate 1212 may be removed without having to remove the cage 1214. It should be appreciated that in any of the embodiments described above in connection with FIG. 12 the substrate may also be constructed of trace contaminant sorbent material itself rather than comprising an underlying substrate with sorbent material applied thereon. It should also be appreciated that in use, a baghouse may contain one or more of these embodiments shown in FIG. 12 with or without ordinary baghouse filter bags. It should be appreciated that any of the substrates of any of the embodiments described in connection with FIG. 12 may be cleaned similarly as the filter bags in the baghouse are cleaned.

Figure 13:
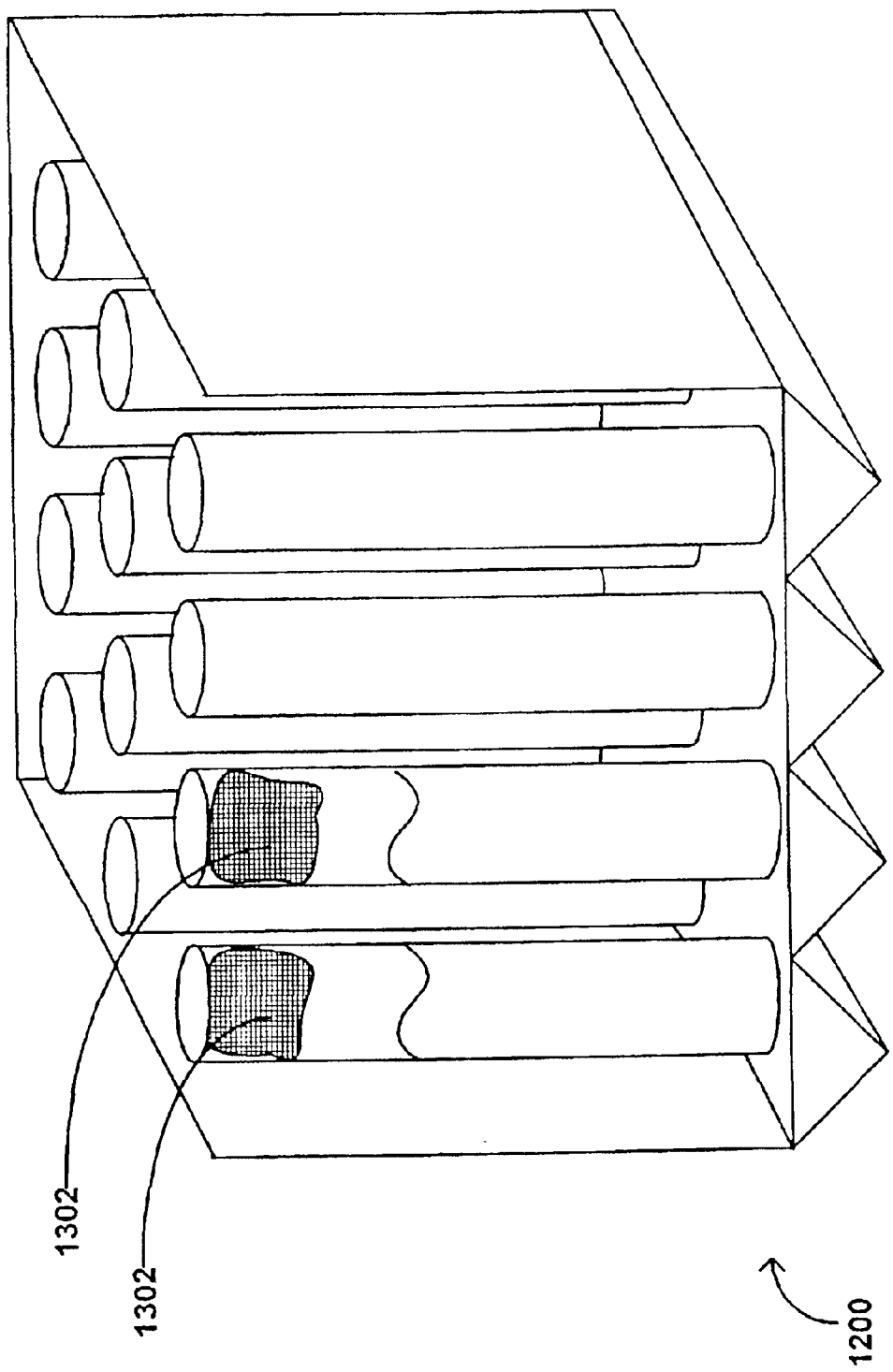
FIG. 13 is a perspective, partial cut-away view of a baghouse according to another embodiment of the present invention.

FIG. 13 is a perspective, partial cut-away view of a baghouse according to another embodiment of the present invention. The baghouse 1200 is similar to that shown in FIG. 12 and may also be a reverse-gas baghouse. In this particular embodiment, a substrate having a trace contaminant sorbent thereon 1302, or a substrate made of a sorbent material, is placed inside of each bag at or near its top. In operation, the gas flow passes into the interior of the bag and out through the top thereby passing by the substrate and allowing trace contaminants to contact and be adsorbed by the sorbent. An example of the substrate in this case may also be a wire mesh material such as chicken wire that is simply pushed together into an irregular shape and placed inside of the bag and cage. In this embodiment, the substrate is easily installed, removed and replaced. It should be appreciated that in use a baghouse may contain this embodiment along with one or more of the embodiments shown in FIG. 12 and with or without ordinary baghouse filter bags.

Figure 14:
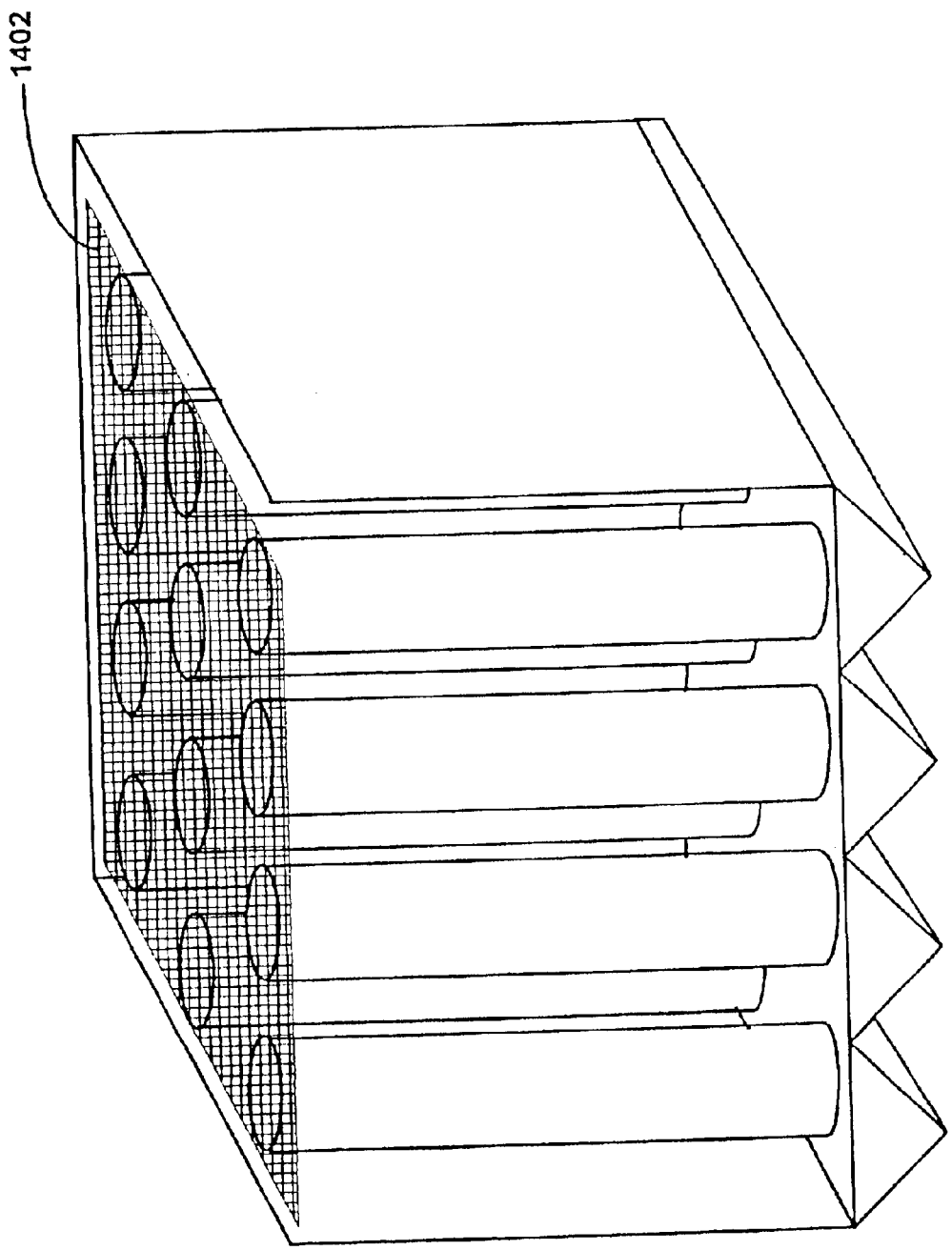
FIG. 14 is a perspective, cut-away view of a baghouse according to another embodiment of the present invention.

FIG. 14 is a perspective, cut-away view of a baghouse according to another embodiment of the present invention. In this embodiment, a single wire mesh type substrate 1402 having a trace contaminant sorbent thereon, or made itself of a trace contaminant sorbent material, is placed on top of the bags. In operation, gas flowing out of the tops of each bag will flow past the substrate 1402 thereby allowing trace contaminants in the gas to be adsorbed onto the sorbent. It should be appreciated that instead of using one wire mesh type substrate, multiple wire mesh type substrates may be used and designed to individually fit over each or any number of desired bags. Further, this particular embodiment may be combined with any one or more of the embodiments described in connection with FIGS. 12 and 13.

Figure 15:
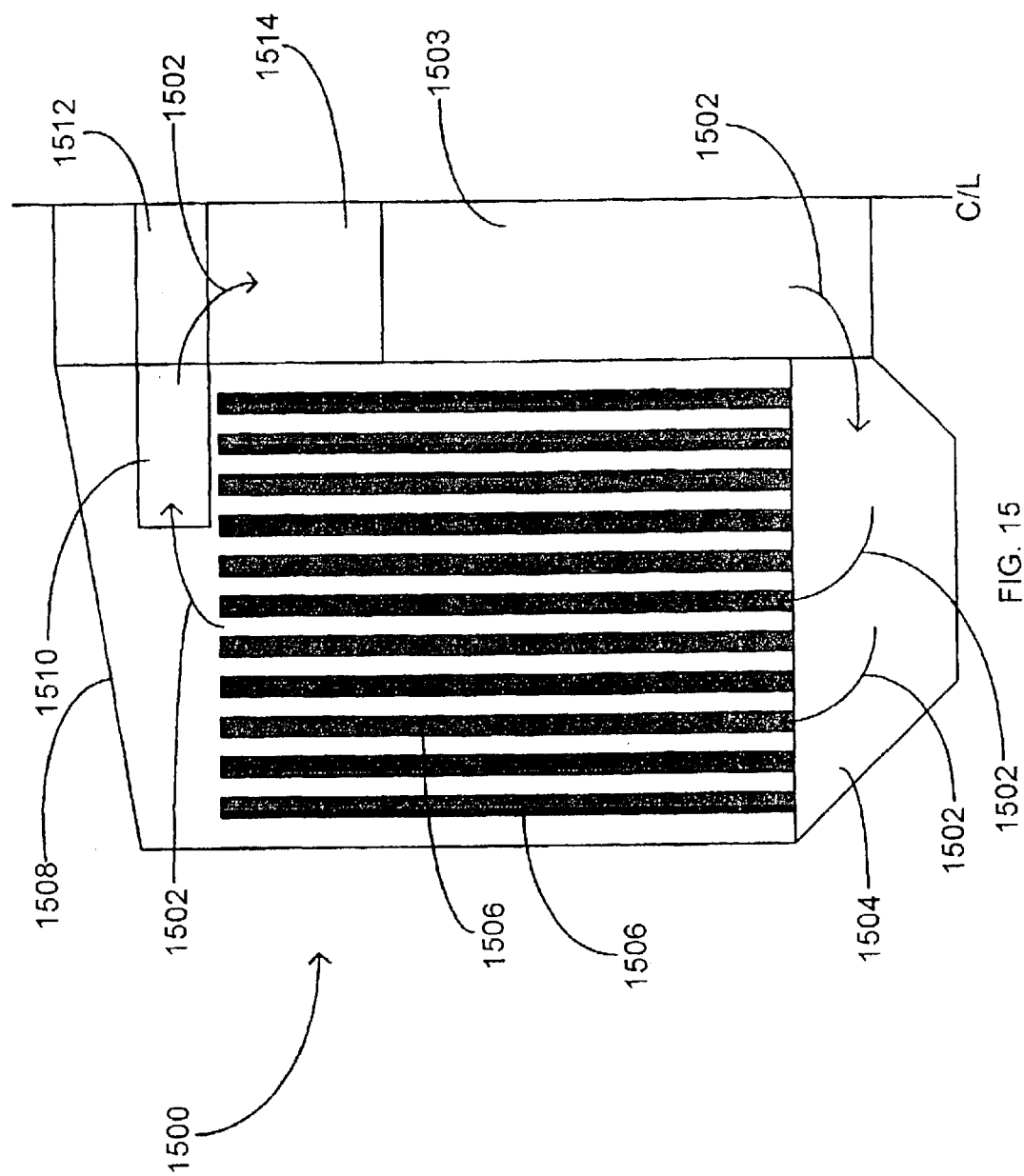
FIG. 15 is partial schematic view of a baghouse according to another embodiment of the present invention.

FIG. 15 is partial schematic view of a baghouse according to another embodiment of the present invention. In this embodiment, flue gas 1502 enters the baghouse in the inlet duct 1503 and passes to the ash hopper 1504 and into the center of the filter bags 1506. The flue gas passes from the center of the filter bags 1506 into the chamber 1508 surrounding the filter bags 1506. The gas then passes by a plurality of substrates 1510 having trace contaminant sorbent thereon or, alternatively, a plurality of substrates made from a sorbent material, which allows for adsorption of trace contaminants onto the sorbent material and removal from the bulk gas. The gas then passes into the outlet plenum 1512.

Figure 16:
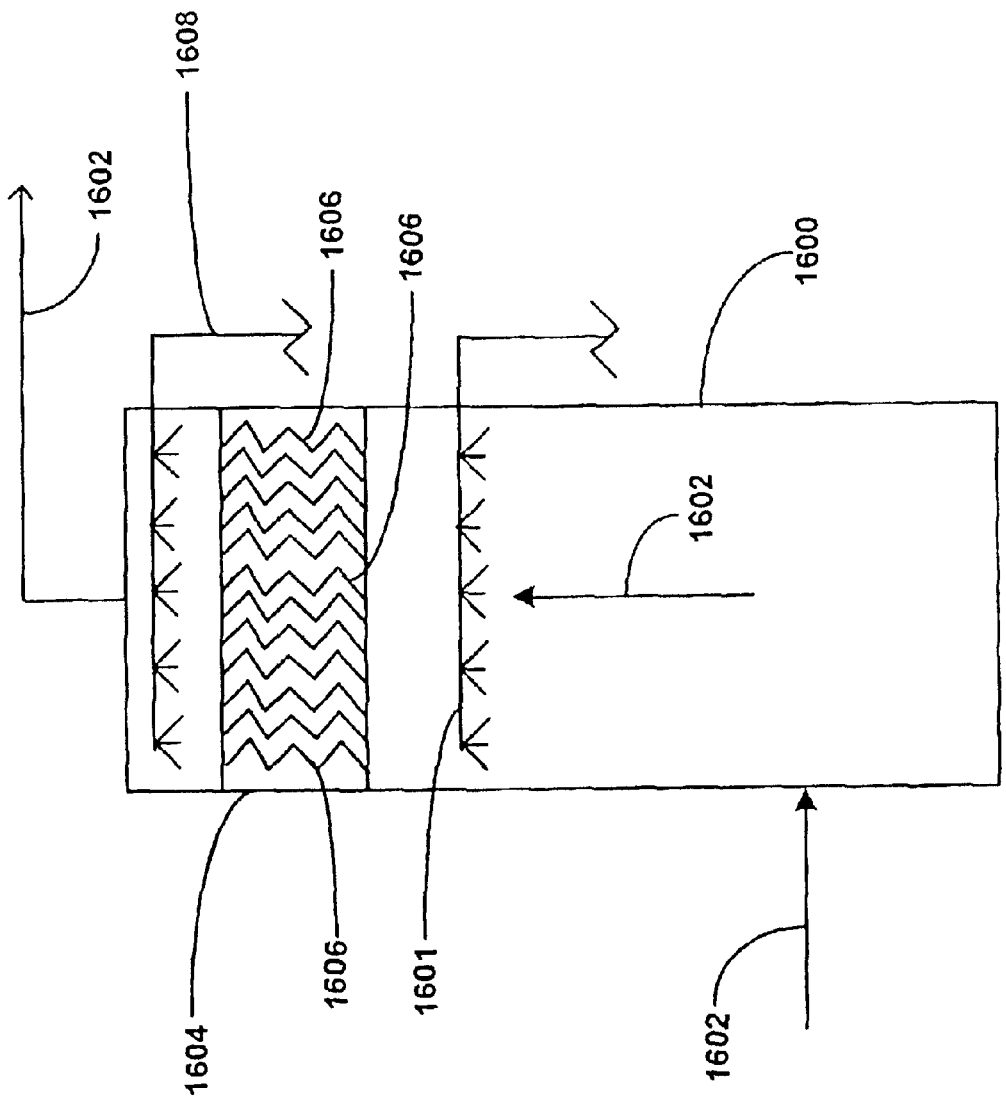
FIG. 16 illustrates another process in which the present invention may be utilized.

FIG. 16 illustrates another process in which the present invention may be utilized. In this embodiment, the present invention is utilized in a counter-current wet scrubber 1600 having spray nozzles 1601. Flue gas 1602 enters the bottom of the wet scrubber 1600 and travels up through the scrubber passing through a mist eliminator 1604 having a mist eliminator wash nozzles 1608 and exits at the top of the wet scrubber 1600. The mist eliminator 1604 comprises mist eliminator vanes 1606 that act to change the gas flow path and thereby remove water or mist entrained in the gas. In this embodiment, one or more of the mist eliminator vanes 1606 may be replaced with a substrate having a trace contaminant sorbent thereon. As the gas passes through the mist eliminator, trace contaminants will contact the trace contaminant sorbent resulting in adsorption of the trace contaminants on the sorbent. It should be appreciated that the mist eliminator having one or more substrates with sorbent material in place of mist eliminator vanes may also be used in a horizontal position where the gas duct is oriented such that the gas flow is in a horizontal direction. It should also be appreciated that the substrates may be cleaned using the mist eliminator wash system that is used to wash the ordinary mist eliminator vanes.

It should be appreciated that the substrate used to replace one or more of the mist eliminator vanes may be any substrate according to the present invention. The shape of this substrate may also be any shape, recognizing that it must allow gas flow to pass by it and also must fit between any remaining mist eliminator vanes in the case where only a few vanes are replaced. Alternatively, each of the mist eliminator vanes may be replaced, in which case, the substrates will need to be shaped to provide mist elimination. For example, the substrates may be shaped the same as the mist eliminator vanes. One specific example of such a substrate is a gold plated mesh that has sufficient rigidity to be shaped similarly to a mist eliminator vane.

FIG. 17 illustrates another process in which the present invention may be utilized. This process is similar to that described in connection with FIG. 16 with the addition of an array of substrates 1702 having a sorbent material disposed on each or made from a sorbent material. As shown, each substrate preferably comprises a flat plate. The number and width of the plate would be determined based, in part, upon the cross-sectional size of the scrubber, and the height or length of the plate, shown as the vertical direction in FIG. 17, would be determined based upon the gas velocity through the scrubber and the properties of trace contaminant to be removed and the sorbent used. It should be appreciated that the array of substrates 1702 may be combined with substrates 1606 in the mist eliminator section as described in connection with FIG. 16. It should also be appreciated that the array of substrates positioned upstream of the mist eliminator may be cleaned using the mist eliminator wash system by adjusting the wash water flow rate so that sufficient water passes from the mist eliminator section to the array of substrates.

Further, it should be appreciated that the position of the array of substrates 1702 may be positioned downstream of the mist eliminator. Also, it should be appreciated that the array of substrates may be used in a horizontal position, where the gas duct is oriented such that the gas flow is in a horizontal direction. One advantage of using a combination of an array of substrates and a separate mist eliminator allows for removal of one or the other without having to lose the functionality provided by the other. For example, if portions of the array of substrates need to be removed for cleaning or regeneration, the mist eliminator section would still be operational to remove entrained mist. Conversely, if the mist eliminator served to provide both trace contaminant removal and mist elimination, removal of the mist eliminator section for cleaning, for example, would result in the loss of trace contaminant removal by those vanes comprising a sorbent.

The invention having been described, the following Examples are presented to illustrate, rather than to limit, the scope of the invention.

EXAMPLE 1

Figure 8:
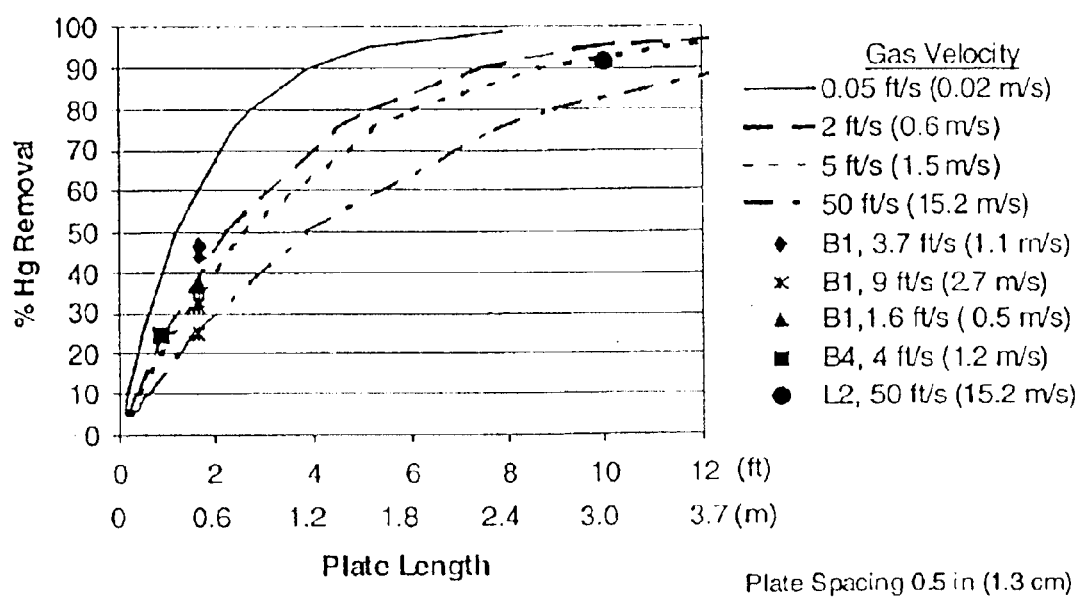
FIG. 8 illustrates test results according to one embodiment of the present invention.

Tests have been conducted in the laboratory and at 7 power plants burning lignite, PRB and bituminous coals to determine real-time mercury removal across gold-coated plates and mercury removal following several weeks of exposure to flue gas at each plant. Tests were conducted downstream of ESPs, scrubbers, spray dryers, and baghouses. FIG. 8 presents the results from these tests as a function of the plate length, where the plates were spaced approximately 0.5 inches apart. In one test, 90% mercury removal was achieved using plates having a length of 10 ft that were spaced approximately 0.5 inches apart at a flue gas velocity of 50 ft/s and a resulting pressure drop of less than 3 inches of water.

EXAMPLE 2

Field tests have been conducted using gold as the sorbent surface downstream of both a wet and dry sulfur dioxide scrubber. Using lignite coal, 70–90% mercury removal was obtained downstream of a spray dryer baghouse configuration at a gas velocity of 30–40 ft/s. The gold plates were 10 ft long and spaced 0.5 inches apart resulting in a pressure drop of approximately 2 inches of water. Tests also showed that the gold-coated plates may be thermally regenerated without degradation of the adsorption capacity. Tests using gold plates 1–3 ft in length with 0.25 inch spacing downstream of a wet scrubber with 8–17 scfm flue gas flow showed 63–95% mercury removal. The gold plates were continuously wetted with wash water from a full-scale mist eliminator.

Various embodiments of the invention have been described above. The descriptions are intended to be illustrative of the present invention and are not intended to be limiting. It will be apparent to one of skill in the art that modifications may be made to the invention as described without departing from the scope of the claims set out below.

For example, it is to be understood that although the invention has been described using as an example mercury, any trace contaminant may be removed by the present invention. It should be also be appreciated that the present invention is adaptable to existing flue gas ducts or for use in new gas ductwork. Furthermore, it is to be understood that although the invention has been described for use in connection with flue gas streams from combustion processes, is contemplated that the invention may be used in connection with any gas stream containing a trace contaminant. It should also be appreciated that in any of the embodiments described that the substrate may either have a sorbent material coated thereon or be constructed from a sorbent material. Also, while the sorbent structure in some embodiments has been described as a rectangular flat plate, it should be appreciated that other shapes for the sorbent structure are contemplated by the present invention.

What is claimed is:

1. An apparatus for removing a trace contaminant from a gas stream, comprising:
    a particulate collection device configured to receive a gas stream comprising a trace contaminant; and
    a plurality of substrates disposed within said particulate collection device, each comprising a trace contaminant sorbent on an exposed surface of each of said substrates,
    wherein said particulate collection device comprises an electrostatic precipitator comprising a plurality of electrically-charged plates for particulate collection and a plurality of locations for individual electrically-charged plates, and wherein each of said substrates are disposed in a corresponding one of said locations for individual electrically-charged plates.

2. The apparatus of claim 1, wherein said particulate collection device further comprises a plurality of gas flow vanes positioned upstream of said electrostatic precipitator and a plurality of locations for individual gas flow vanes, and further comprising a second plurality of substrates, each comprising a trace contaminant sorbent on an exposed surface, and wherein each of said substrates of said second plurality of substrates are disposed in a corresponding one of said locations for individual gas flow vanes.

3. An apparatus for removing a trace contaminant from a gas stream, comprising:
    a particulate collection device configured to receive a gas stream comprising a trace contaminant; and
    a plurality of substrates disposed within said particulate collection device, each comprising a trace contaminant sorbent on an exposed surface of each of said substrates, wherein said particulate collection device comprises an electrostatic precipitator, a plurality of gas flow vanes positioned upstream of said electrostatic precipitator, and a plurality of locations for individual gas flow vanes, and wherein each of said substrates are disposed in a corresponding one of said locations for individual gas flow vanes.

4. An apparatus for removing a trace contaminant from a gas stream, comprising:
    a particulate collection device configured to receive a gas stream comprising a trace contaminant; and
    a plurality of substrates disposed within said particulate collection device, each comprising a trace contaminant sorbent on an exposed surface of each of said substrates, wherein said particulate collection device comprises a baghouse, and wherein said substrates each comprise a cylindrical rod positioned vertically within a bag within said baghouse.

5. An apparatus for removing a trace contaminant from a gas stream, comprising:
    a wet scrubber comprising a mist eliminator configured to receive a gas stream comprising a trace contaminant;
    a plurality of substrates disposed within said mist eliminator, each comprising a trace contaminant sorbent on an exposed surface of each of said substrates.

6. The apparatus of claim 5, further comprising a mist eliminator wash system.

7. An apparatus for removing a trace contaminant from a gas stream, comprising:
    a particulate collection device comprising a baghouse configured to receive a gas stream comprising a trace contaminant;
    a wire mesh substrate disposed within said baghouse comprising a trace contaminant sorbent on an exposed surface of said substrate, wherein said wire mesh substrate comprises a cylindrical roll positioned within a bag within said baghouse.

8. An apparatus for removing a trace contaminant from a gas stream, comprising:
    a particulate collection device comprising a baghouse configured to receive a gas stream comprising a trace contaminant;
    a mesh substrate disposed within said baghouse comprising a trace contaminant sorbent on an exposed surface of said substrate, wherein said mesh substrate is positioned within and near the top of a bag within said baghouse.

9. An apparatus for removing a trace contaminant from a gas stream, comprising:
    a particulate collection device comprising a baghouse configured to receive a gas stream comprising a trace contaminant;
    a mesh substrate disposed within said baghouse comprising a trace contaminant sorbent on an exposed surface of said substrate, wherein said mesh substrate is flat and is disposed over the top of a plurality of bags within said baghouse.

10. An apparatus for removing a trace contaminant from a gas stream, comprising:
    a wet counter-current scrubber; and
    a plurality of substrates having a trace contaminant sorbent material disposed thereon positioned inside of said wet counter-current scrubber.

11. The apparatus of claim 10, further comprising a mist eliminator and wherein said plurality of substrates is positioned downstream of said mist eliminator.

12. The apparatus of claim 10, further comprising a mist eliminator and wherein said plurality of substrates is positioned upstream of said mist eliminator.

13. The apparatus of claim 12, further comprising a mist eliminator wash system.

14. An apparatus for removing a trace contaminant from a gas stream, comprising:
    a particulate collection device configured to receive a gas stream comprising a trace contaminant, wherein said particulate collection device comprises an electrostatic precipitator; and
    a plurality of substrates each comprising a trace contaminant sorbent on an exposed surface of each of said substrates, wherein said plurality of substrates is-positioned within an outlet damper valve chamber downstream of said electrostatic precipitator.

15. The apparatus of claim 1, wherein said plurality of substrates comprises a plurality of metal plates.

16. The apparatus of claim 1, wherein said plurality of substrates each comprise a material that is a trace contaminant sorbent.

17. The apparatus of claim 3, wherein said plurality of substrates comprises a plurality of metal plates.

18. The apparatus of claim 3, wherein said plurality of substrates each comprise a material that is a trace contaminant sorbent.

19. The apparatus of claim 4, wherein said plurality of substrates comprises a plurality of metal plates.

20. The apparatus of claim 4, wherein said plurality of substrates each comprise a material that is a trace contaminant sorbent.

21. An apparatus for removing a trace contaminant from a gas stream, comprising:

a particulate collection device comprising a baghouse configured to receive a gas stream comprising a trace contaminant; and a mesh substrate comprising a trace contaminant sorbent on an exposed surface of said substrate, wherein said mesh substrate is positioned within a bag within said baghouse.

22. The apparatus of claim 21, wherein said mesh substrate is positioned near the top of said bag.

* * * * *